US007054747B2

(12) United States Patent
Ruelke et al.

(10) Patent No.: US 7,054,747 B2
(45) Date of Patent: May 30, 2006

(54) SYSTEM AND METHOD FOR INTEGRATING ENVIRONMENTAL SENSORS AND ASYNCHRONOUS UBICATION REPEATERS FORMING AN N-POINT SPATIALLY RANDOM VIRTUAL LATTICE NETWORK

(75) Inventors: Charles R. Ruelke, Margate, FL (US); Charles B. Swope, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 121 days.

(21) Appl. No.: 10/924,044

(22) Filed: Aug. 23, 2004

(65) Prior Publication Data

US 2006/0041395 A1 Feb. 23, 2006

(51) Int. Cl.
*H04B 7/14* (2006.01)
*G08C 17/02* (2006.01)

(52) U.S. Cl. .............................................. 702/2; 702/5

(58) Field of Classification Search .................... 702/2, 702/5, 6, 14
See application file for complete search history.

(56) References Cited

U.S. PATENT DOCUMENTS

| | | | | |
|---|---|---|---|---|
| 6,023,223 | A * | 2/2000 | Baxter, Jr. | 340/531 |
| 6,885,299 | B1 * | 4/2005 | Cooper et al. | 340/539.26 |
| 2002/0008625 | A1 * | 1/2002 | Adams et al. | 340/573.1 |
| 2002/0188522 | A1 * | 12/2002 | McCall et al. | 705/26 |
| 2004/0012491 | A1 * | 1/2004 | Kulesz et al. | 340/506 |
| 2004/0082341 | A1 * | 4/2004 | Stanforth | 455/456.1 |
| 2004/0128091 | A1 * | 7/2004 | Delin et al. | 702/75 |
| 2005/0226201 | A1 * | 10/2005 | McMillin | 370/348 |

* cited by examiner

*Primary Examiner*—Donald McElheny, Jr.

(57) ABSTRACT

A system for integrating environmental sensors and asynchronous ubication repeaters forming an n-point spatially random virtual lattice network (100) includes a ubication repeater (101) for communicating both positional and environmental information to a two-way radio transceiver (102) used by police or firefighters. The ubication repeater (101) initially determines its position upon actuation from the two-way radio transceiver (102) where environmental information can be transmitted to the firefighter's two-way radio transceiver (102) or to a central location (104). The central location (102) can provide a composite overview of an environmental situation during an emergency.

14 Claims, 2 Drawing Sheets

100

SYSTEM AND METHOD FOR INTEGRATING ENVIRONMENTAL SENSORS AND ASYNCHRONOUS UBICATION REPEATERS FORMING AN N-POINT SPATIALLY RANDOM VIRTUAL LATTICE NETWORK

TECHNICAL FIELD

This invention relates in general to environmental sensors and more particularly to integrating an environmental sensor and an asynchronous ubication repeater to form a virtual lattice network.

BACKGROUND

The latest developments in wireless fidelity (WiFi) technologies have created the ability to create both fixed and ad hoc networks. Little attention has been given to low-cost, simple "bread crumb" technologies that operate without the necessity of networking.

It is well known that the bread crumb beacons have long been considered for firefighting applications. However, this type of beacon was not often seriously considered due to its bulky size. Moreover, there have always been concerns that a bread crumb beacon could drop from a network if burned or destroyed due to high temperatures. In network applications, loss of one beacon could disable the network rendering it unable to be useful to the firefighter.

Thus, the need exists for a less expensive, more reliable, bread crumb technology that can be used by firefighters to convey position and environmental information without the need to be networked.

SUMMARY OF THE INVENTION

Briefly, according to the invention, there is provided a system and method for integrating environmental sensors with asynchronous ubication repeaters to form an n-port spatially random virtual lattice. The invention takes advantage of traditional information used by firefighters as they progress through a structure individually or as a team. A virtual network is established through placement of ubication repeaters by the firefighters during penetration into the structure. Once activated, a ubication repeater is position-stamped and begins pulsed transmissions of the repeater position and environmental data in proximity to the repeater. These transmitted signals give real time condition updates for specific locations in the building structure to both a firefighter and central location.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
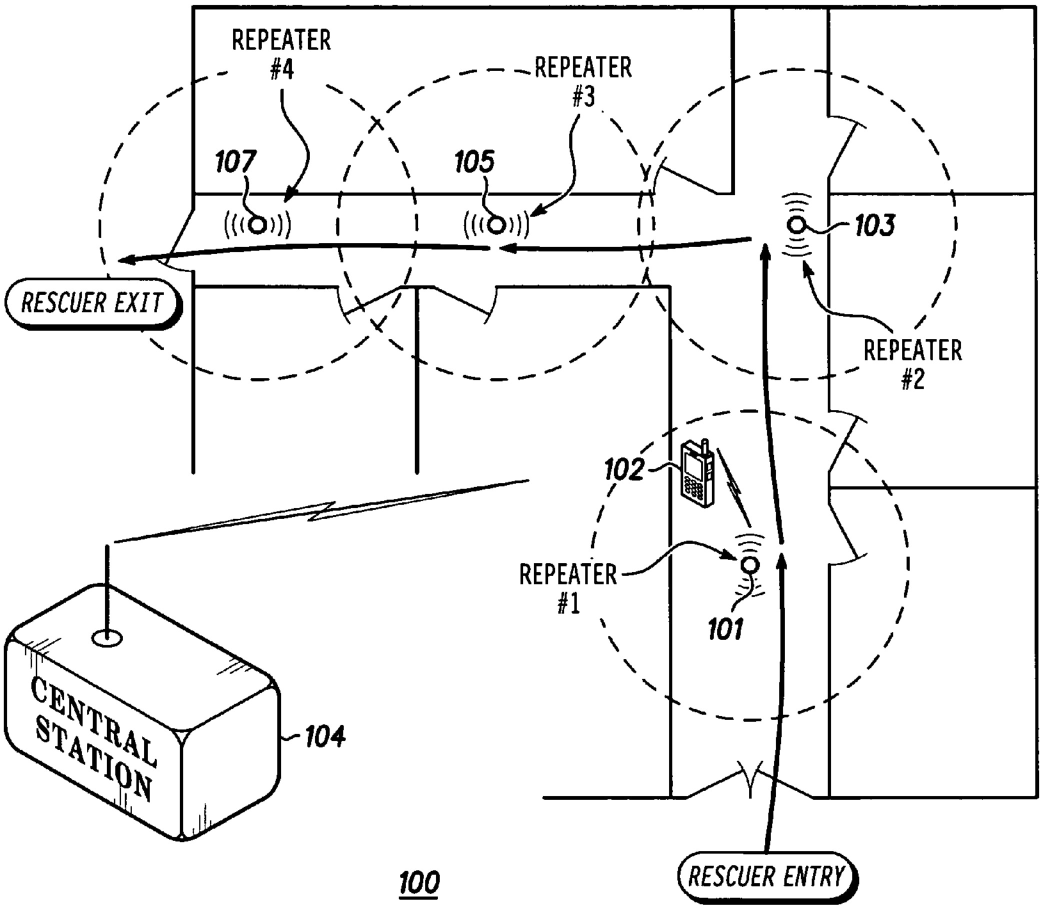
FIG. 1 is a block diagram showing operating of the virtual lattice network with ubication breadcrumbs in accordance with an embodiment of the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a virtual lattice network with ubication bread crumbs 100 illustrates operation of the invention as used by a firefighter when entering a building. As the firefighters or rescuers enter the building, they can decide the first placement of a ubication repeater 101. The ubication repeater may be enabled merely by pulling the repeater from the user's fire jacket or, alternatively, by squeezing the bread crumb ubication repeater which would switch it to an active state. Repeaters in the invention are referred to as "ubication" repeaters since they refer to a quality or state of being in a place, local relation, position or location.

The ubication repeater 101 can only be enabled by a firefighter with location capable technology. This enables the firefighter's two-way radio 102 or other device to convey location information to the ubication repeater 101 as it is activated at its selected location. Thus, each repeater is automatically position stamped prior to placement, allowing the ubication repeater 101 to convey its position to both an oncoming firefighter or a central network station 104. The central network station might typically be located at a command post or at the fire truck located outside the building. This allows information to be reviewed by a rescue intervention team (RIT) using a heads up display (HUD) to provide a composite overview of all ubication information in the event there is no visibility within the building.

Once enabled, the environmental status with position is continuously transmitted or "chirped" to the central network station or other firefighter in close proximity to the ubication repeater 101. This ubication information represents environmental data including but not limited to ambient temperature, air pressure, relative humidity and/or the presence of any harmful airborne chemicals or biotoxins that would be harmful to the firefighter.

As the firefighter moves through the building, additional ubication repeaters 103, 105, 107 are similarly positioned that will convey position and environmental information to the central network station. The ubication repeaters may be activated as needed in order to cover a predetermined route until the firefighter or rescuer exits the building. Any number of ubication repeaters may be used as needed to establish coverage zones within a building, allowing the firefighter the ability to be alerted when approaching a ubication repeater that senses a dangerous condition.

Since each ubication repeater is not formally networked with other repeaters in a backbone, i.e., each ubication repeater does not communicate with others to establish communication, only a "virtual" network is established with the radio system used by the firefighters. For example, only the central station 104 used for communication by the firefighters would be able to interpret data from all of the ubication repeaters. Communication from the ubication repeaters 101, 103, 105, 107 to the central station 104 is achieved through background or manually initiated communication via a firefighter's radio 102 that is in proximity to a given repeater. Thus, when multiple firefighters, operating over a wide area, are periodically passing through multiple ubication repeaters zones enabling updates by the ubication repeater to the central station via the firefighters' radios, the central station is able to obtain a general overview of the operational environment for the area surrounding the repeaters. This enables firefighter command personnel to communicate pertinent information to all or any group of firefighters who may be outside a specific ubication repeater zone, even though any approaching firefighter could be alerted by the ubication repeater directly when in its immediate zone. Given that in an emergency situation, a first responder's ingress and egress routes for a building are often consistent and are vital to personal safety, placement of the ubication repeaters upon initial building entry enables those persons operating at the central station to monitor the overall usability of a vital route within a building, enhancing firefighter safety in a fire or other emergency situation.

Figure 2:
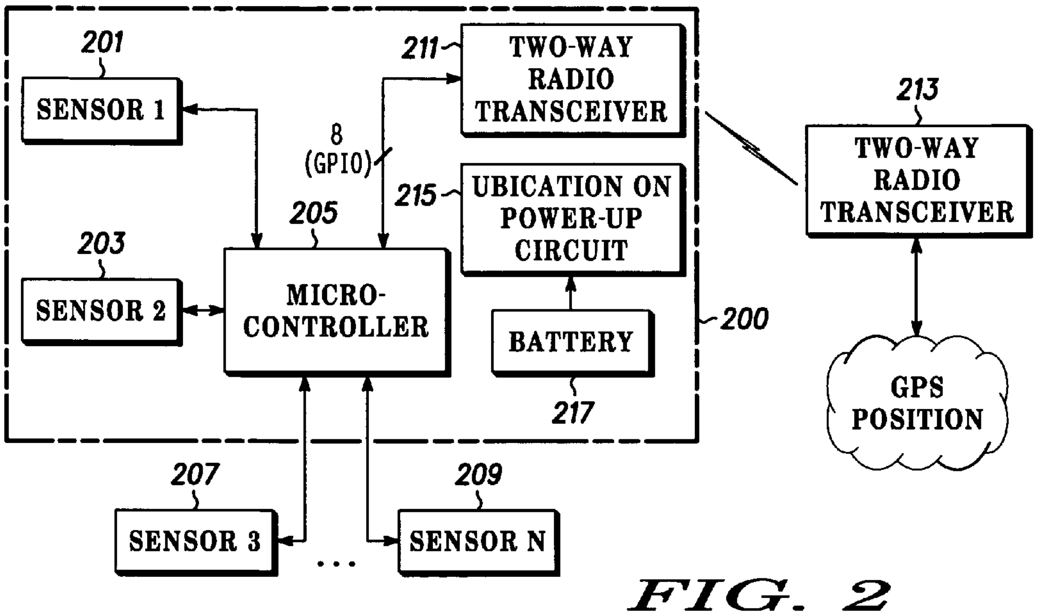
FIG. 2 is a block diagram showing operation of a ubication bread crumb repeater used in the embodiment shown in FIG. 1.

The wireless communications between the ubication repeater and the firefighter's portable radio, and communication between the portable radio and the central station can be structured as simply as deemed necessary. For example, a "Bluetooth" Asynchronous Connection Link (ACL) could be established between the firefighter's radio and the ubication repeater during initial position-stamp and placement of the ubication repeater. The firefighter's radio would then communicate the pertinent information received from the ubication repeater back to the central station on secondary frequencies utilizing the Association of Public Safety Communications Officials (APCO) protocol structure, or using asynchronous ALOHA protocol for very simple applications. If asynchronous collisions between the radio and central station increased beyond an acceptable threshold, synchronous Time Division Multiple Access (TDM) communication using protocols such as are being made available in the 700 MHz public safety band could be utilized. It will be apparent to those skilled in the art that any number of wireless protocols and technologies could be employed to establish connectivity between the ubication repeater and portable radio, and between the portable radio and the central station without departing from the spirit of this invention FIG. 2 illustrates a block diagram of a ubication bread crumb repeater 200 where a plurality of sensors are used to determine environmental conditions. A first sensor 201, second sensor 203 are shown connected to a microprocessor 205 that works to interpret incoming environmental data such as temperature, pressure, relative humidity, harmful chemicals or biotoxins. A third sensor 207 or up to N sensors 209 may be used externally with the ubication repeater 200 to provide any needed environmental data to the microprocessor 205.

The ubication repeater 200 further includes a two-way radio transceiver 211 used to communicate information to an external radio transceiver 213 either worn by the firefighter or received by a central network station (not shown). The ubication repeater 200 further includes a power-on circuit 215 and a battery 217 allowing it to operate portably with its own internal power supply.

Figure 3:
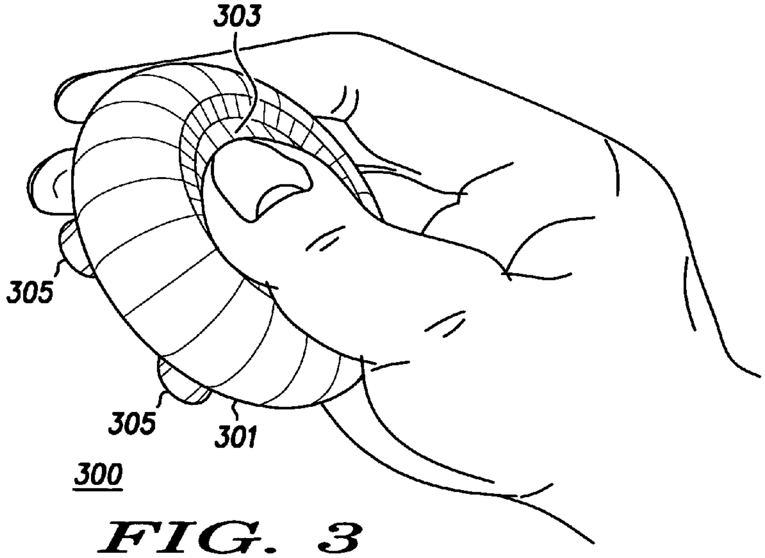
FIG. 3 is a front elevational view of the physical model of the ubication bread crumb repeater as described in FIG. 1.

FIG. 3 illustrates a front elevational view of the physical model for the ubication repeater 300. The ubication repeater typically may take the form of a disk-like housing 301 that may be easily worn or carried by a firefighter on his fire jacket or the like. When pulled from the jacket, the firefighter may activate the repeater with a top mounted push button switch 303. The firefighter might typically position the repeater on the floor of the building where a plurality of feet 305 might be used to hold the ubication repeater in a fixed position.

Thus, to summarize, a virtual lattice or trail of ad hoc bread crumbs are generated in real time by first firefighter responders as they first enter a building. When each bread crumb ubication repeater is activated, a location stamp is automatically registered between the firefighter's tactical position via his two-way radio. The ubication repeater is deployed and subsequent repeaters are activated and left at intervals of approximately 50 to 100 meters at the firefighter's discretion. The stamped location registered at repeater placement during entry is continuously chirped after deployment as the firefighter continues to penetrate the building. Small environmental sensors located within the ubication repeater monitor the local ambient environment with reference and real-time calibration. Should the environment degrade beyond the environmental stress threshold after placement, a warning signal is chirped along with the location stamp that will alert the firefighter to an environmental danger should that firefighter attempt to egress the building in the manner in which he entered.

The bread crumb ubication repeater is a low-cost throw-away solution with very low transmit power which is not interfaced to any backbone network. The information is registered by the individual firefighter when he is in proximity to the ubication repeater which is later decoded by a receiver. The ubication repeater can also be used as a damage assessment module (DAM) that allows the firefighter to activate the bread crumb and toss the sensor into an unknown room. This allows the firefighter a great deal of versatility, allowing him to verify environment remotely before exposing himself physically to a potential hazard.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A system for integrating environmental sensors and asynchronous ubication repeaters forming an n-point spatially random virtual lattice network comprising:

at least one ubication repeater for communicating both positional and environmental information to a two-way radio transceiver; and wherein the at least one ubication repeater initially determines its position upon actuation from a user's two-way radio transceiver.

2. A system for integrating environmental sensors and asynchronous ubication repeaters as in claim 1, wherein the environmental information includes at least one from the group of ambient temperature, air pressure, relative humidity, chemical compositions or harmful biotoxins.

3. A system for integrating environmental sensors and asynchronous ubication repeaters as in claim 1, wherein the at least one ubication repeater operates in a virtual network independent of other ubication repeaters.

4. A system for integrating environmental sensors with a ubication repeater to form a virtual lattice network comprising:

a first ubication repeater having at least one environmental sensor for communicating environmental information in a first zone;

a second ubication repeater having at least one environmental sensor for communicating environmental information in a second zone; and wherein the first ubication repeater and second ubication repeater are set with their precise position using a user's two-way communications device prior to deployment.

5. A system for integrating environmental sensors with a ubication repeater as in claim 4, wherein the first ubication repeater and the second ubication repeater do not communicate with one another in the virtual lattice network.

6. A system for integrating environmental sensors with a ubication repeater as in claim 4, wherein the at least one environmental sensor senses at least one function from the group of ambient temperate, air pressure, relative humidity and harmful airborne chemicals or biotoxins.

7. A system for integrating environmental sensors with a ubication repeater as in claim 4, wherein the first ubication repeater and second ubication repeater communicate environmental information to both a user within the respective zone and a central network station.

8. A method for integrating an environmental sensor and an asynchronous ubication repeater, comprising the steps of:

activating at least one environmental sensor;

conveying the positional information to the at least one environmental sensor;

deploying the at least one environmental sensor within a building;

transmitting positional information and environmental information from the at least one environmental sensor to a user who is within a proximity of the least one sensor.

9. A method for integrating an environmental sensor and an asynchronous ubication repeater as in claim 8, further comprising the step of:

establishing a virtual network with the at least one environmental sensor with a central network station.

10. A method for integrating an environmental sensor and an asynchronous ubication repeater as in claim 8, wherein the at least one environmental sensor does not communicate with another at least one environmental sensor.

11. A method for integrating an environmental sensor and an asynchronous ubication repeater as in claim 8, wherein the at least one environmental sensor monitors at least one from the group of ambient temperature, air pressure, relative humidity and harmful airborne chemicals or biotoxins.

12. A system for integrating environmental sensor and asynchronous ubication repeaters to form an n-point spatially random virtual lattice network comprising the steps of:

transmitting from at least one subscriber radio to a ubication repeater a position location stamp for identifying the position of the ubication repeater;

transmitting ubication information from the ubication repeater to the at least one subscriber radio;

transmitting ubication information from the at least one subscriber radio to a central station; and processing ubication information at the central station from the at least one subscriber radio to provide a composite overview of an environmental condition.

13. A system for integrating environmental sensor and asynchronous ubication repeaters as in claim 12, wherein the ubication information includes both sensory data and location information.

14. A system for integrating environmental sensor and asynchronous ubication repeaters as in claim 12, wherein the sensory data includes at least one function from the group of ambient temperature, air pressure, relative humidity and harmful airborne chemical or biotoxins.

* * * * *